United States Patent

[11] 3,575,451

| [72] | Inventors | Marion G. Konrad<br>Hacienda Heights;<br>John W. Erickson, Huntington Beach, Calif. |
|---|---|---|
| [21] | Appl. No. | 750,822 |
| [22] | Filed | Aug. 7, 1968 |
| [45] | Patented | Apr. 20, 1971 |
| [73] | Assignee | Preco, Inc.,<br>Los Angeles, Calif. |

[54] LOCKING MECHANISM FOR LOAD-DIVIDING GATE
2 Claims, 5 Drawing Figs.

[52] U.S. Cl. .................................................. 292/35, 292/36
[51] Int. Cl. .................................................. E05c 9/06
[50] Field of Search .................................. 292/35, 36, (M), (TC), 94, 167, 168, 41; 49/26, (Crg), 449

[56] References Cited
UNITED STATES PATENTS

| 609,197 | 8/1898 | Fries | 292/36 |
| 834,097 | 10/1906 | Wray | 292/167 |
| 982,010 | 1/1911 | Neel | 292/35 |
| 998,642 | 7/1911 | Shean | 292/36 |
| 3,324,595 | 6/1967 | Loomis | 49/450 |
| 3,352,257 | 11/1967 | Lehnert et al. | 292/36 |

*Primary Examiner*—Richard E. Moore
*Attorney*—Charlton M. Lewis

ABSTRACT: Locking pins for load-dividing gates in freight vehicles and the like are operated by a linkage that includes a coupling member movable parallel to the plane of the gate and laterally of the axis of movement of the locking pin. The member is coupled by pivoted links to the pin and to a pivot mounted on the gate. That pivot may be fixed on the gate, or may be carried by a second pin, oppositely projectable along the same axis as the first. In gate locking position of the pins, the links typically are essentially parallel, positively locking the pins in projected positions. All pins can typically be operated from the center of the gate or from either gate edge, the links themselves providing operating handles in many forms of the invention.

Patented April 20, 1971
3,575,451
2 Sheets-Sheet 1
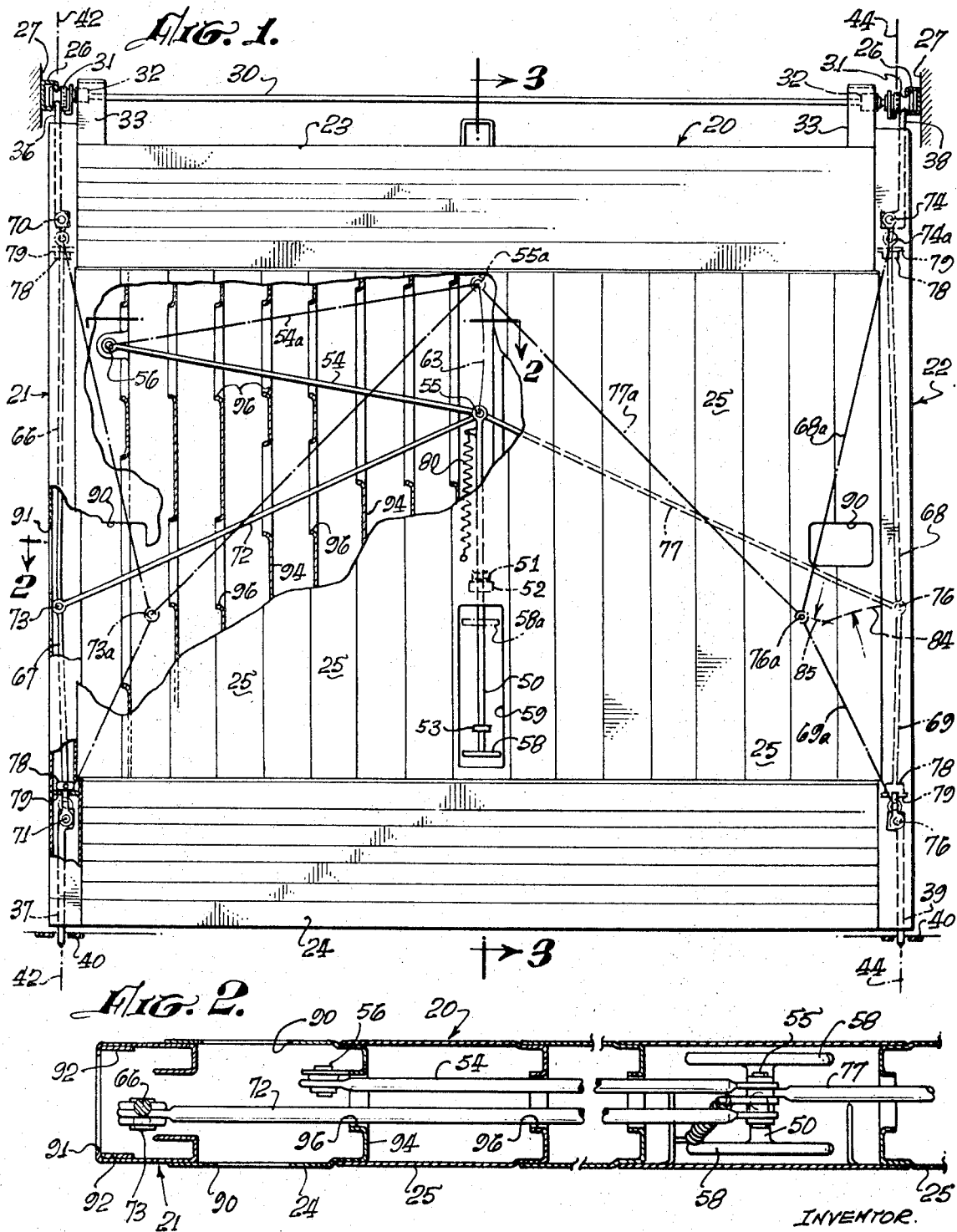
INVENTOR.
MARION G. KONRAD,
JOHN W. ERICKSON,
BY Charlton M. Lewis

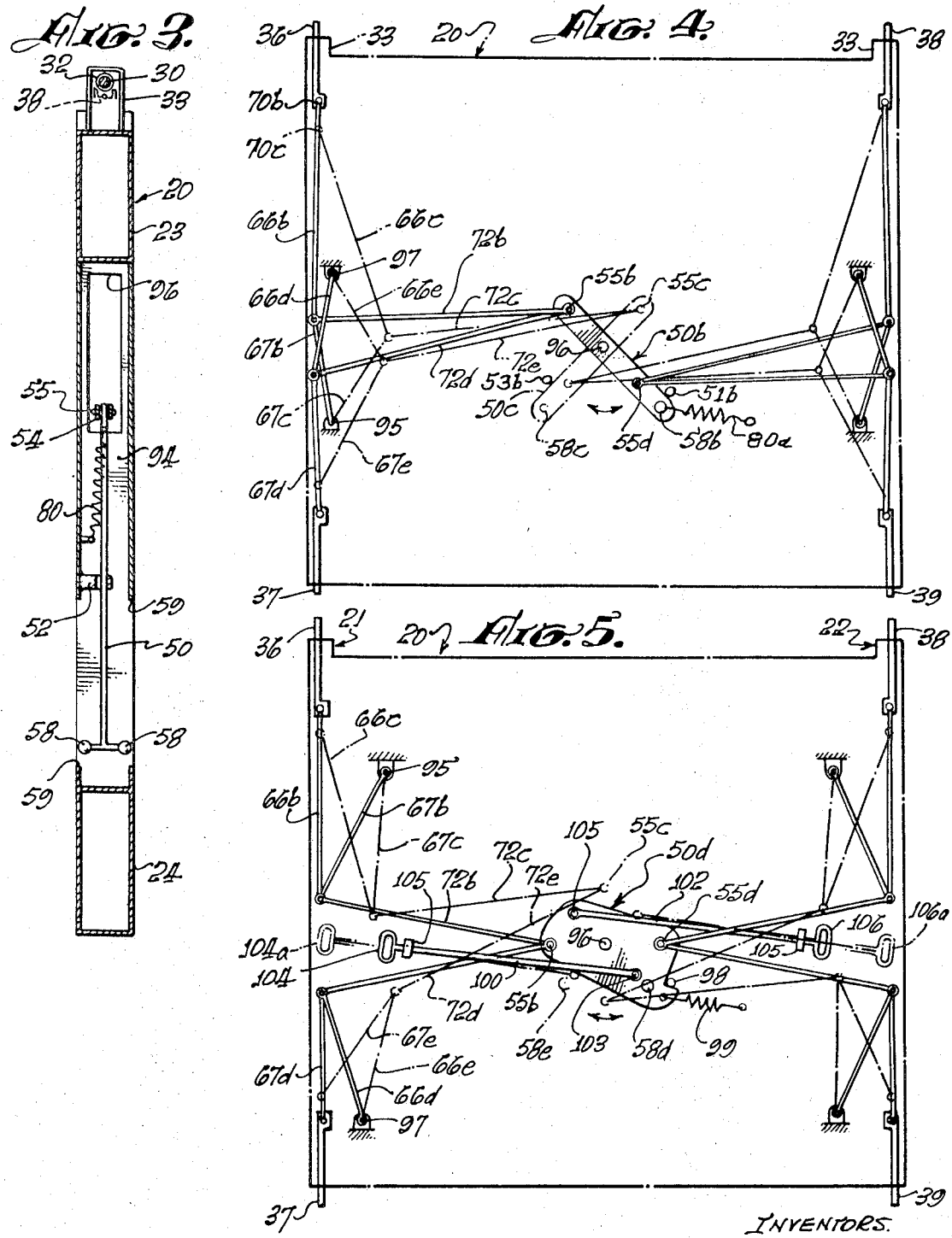

LOCKING MECHANISM FOR LOAD-DIVIDING GATE

This invention has to do with improved mechanism for locking and releasing load-dividing gates that are shiftable between a plurality of working positions in freight vehicles and the like.

The invention provides mechanism on such a gate for operating one or more locking pins that are projectable beyond an edge of the gate to engage fixed locking formations mounted on the vehicle.

The present gate-locking system is particularly, but not exclusively, applicable to the conventional arrangement of locking pins, whereby two pins at the upper corners of the gate are projectable upward into locking apertures, typically formed in the same rails from which the gate is suspended, and two pins at the lower corners of the gate are projectable downward into metal strips set in the vehicle floor.

The invention provides a linkage pivot mounted on the gate, a coupling member movable parallel to the plane of the gate and laterally of the axis of pin movement, two links interconnecting the coupling member with the pivot and with the pin, respectively, and control means for shifting the coupling member between gate-locking and gate-releasing positions. The pivot may be fixed on the gate, or may be carried by a second locking pin, mounted on the same axis as the first and oppositely projectable from the opposite edge of the gate, one coupling member then operating both pins. In gate locking position of the mechanism, the two links are typically approximately parallel, providing a toggle action that maintains positive pin projection.

The invention has the outstanding advantages that the control mechanism is conveniently operable alternatively at the center of the gate or adjacent either side edge of the gate; that the handle movements are parallel to the plane of the gate, so that the handles can be recessed and need not project at any time from the face of the gate; and that the pins may be secured in their projected, gate-locking positions by a toggle mechanism that positively prevents the pins from working loose even under extreme conditions of vibration or shock. Whereas each of those advantages has been provided individually by one or more previously available structures, no previous control system provides them in combination.

In the drawings:

FIG. 1 is an elevation, partly broken away, representing a load-dividing gate embodying the invention;

FIG. 2 is a section on line 2-2 of FIG. 1;

FIG. 3 is a section on line 3-3 of FIG. 1;

FIG. 4 is a schematic drawing representing a modification; and

FIG. 5 is a schematic drawing representing a further modification.

In FIGS. 1 to 3 an illustrative load-dividing gate is designated generally by the numeral 20 and comprises the side posts 21 and 22, the upper and lower beams 23 and 24, respectively, and the vertical channel members 25, which typically interlock with each other, as shown best in FIG. 2, and form collectively a panel structure that essentially fills the central portion of the gate. The gate is typically suspended from the rails 26, which are rigidly mounted in parallel spaced relation, as on opposite sidewalls 27 of the lading compartment. The present illustrative suspension comprises the squaring shaft 30, journaled by the bearings 32 on bracket structures 33 which form part of the gate frame. The sprocketed rollers 31 are rotationally fixed at the shaft ends and are supported on the respective rails 26 with their sprocket teeth engaging apertures in the rail and thereby maintaining the shaft accurately perpendicular to the rails as it rolls along them.

The gate is locked in a selected working position in the lading compartment by means of the two upper locking pins 36 and 38, which enter suitable apertures in the rails 26 and by the two lower locking pins 37 and 39, which enter apertures in the floor or in metal strips 40 set into the floor. The two locking pins 36 and 37 are slidably mounted in the side post 21 for vertical movement along respective axes which typically coincide and are indicated at 42. The locking pins 38 and 39 are similarly mounted on the axis 44 in the other side post 22. That arrangement of locking pins is well known in and of itself, and such pin structure may be used for locking gates that are suspended by means of many different types of mechanism, of which the present suspension is only illustrative.

The present invention provides mechanism for controlling the sliding movement of locking pins 36 through 39 by means of the single handle member 50, which is vertically slidable along the centerline of the gate. That sliding movement is guided by any suitable mechanism, shown as comprising the guide bracket 52, which slidingly surrounds slider 50, and the guide link 54, one end of which is pivoted to the upper end of slider 50 on the pivot axis 55. The other end of link 54 is pivoted on the pivot axis 56, fixedly supported on the gate structure. The handles 58 are mounted at the lower end of slider 50 in oppositely offset positions to be conveniently reached through the access openings 59 in the respective faces of the gate. Handle 58 is movable from the normal gate-locking positions shown in solid lines in FIG. 1 to the gate releasing position indicated at 58a. Those positions are defined by the stop collars 51 and 53, respectively, which are adjustably mounted on slider 50 and engage bracket 52. During that movement guide link 54 swings about pivot 56 to the position indicated at 54a. The resulting arcuate path 63 of movement of pivot axis 55 to the position indicated at 55a may be considered as a straight line for most practical purposes.

The two locking pins 36 and 37 which move on the axis 42 are interconnected by the upper and lower links 66 and 67, respectively, which are pivotally connected to pin 36 on the axis 70 and to pin 37 on the axis 71, respectively. The links 66 and 67 are pivotally connected together and to one end of the coupling link 72 on the pivot axis 73. The other end of link 72 is pivoted to slider 50, typically on the axis 55, already described. A similar structure is provided for the two locking pins 38 and 39 which move on the pin axis 44. That structure comprises the upper and lower links 68 and 69, connected to the pins on the respective pivot axes 74 and 75 and connected together on the pivot axis 76. The coupling link 77 interconnects the pivot axes 55 and 76.

Each of the locking pins is limited in its sliding movement by positive stops which comprise the fixed plate 79 which limits retraction of each pin by engaging the pinhead and limits pin projection by engaging the collar 78 which is adjustably mounted on the pin-operating link.

In operation of the described structure movement of handle 58 to gate releasing position 58a shifts pivot 55 to 55a, as already indicated, drawing with it the inner ends of the two coupling links 72 and 77. The outer ends of those two links are correspondingly drawn inward parallel to the plane of the gate, but are constrained in their movement by the links coupling them to the respective locking pins. The configuration of the linkage is so designed that movement of pivot axis 73 inward to its gate releasing position 73a produces retraction of both locking pins 36 and 37. Correspondingly, movement of pivot axis 76 to 76a retracts the pair of locking pins 38 and 39. The gate is thereby released for movement along rails 26. Return of control handle 58 from 58a to its gate locking position projects all four locking pins into engagement with their respective rails, again locking the gate in fixed position in the lading compartment. The weight of slider 50 and of links 54, 72 and 77 tends to maintain the mechanism in gate-locking position. That tendency may be increased, if desired, by providing a suitable spring at any convenient point in the system, preferably acting directly on slider 50, as indicated schematically by the spring 80.

During operation of the pin control mechanism the weight of the pins themselves and of links 66 through 69 tends to maintain the lower pins in projected position. Thus the release movement typically comprises two distinguishable portions. As handle 58 is initially lifted from gate-locking positions, pivot 76, say, initially tends to swing along the arc 84 about pivot 75. Upper pin 38 is thereby retracted with the aid of gravity, while lower pin 39 remains projected in locking position. That movement continues until upper pin 38 strikes its positive stop 79, preventing further retraction. Pivot 76 is then constrained to swing along the arc 85 about the retracted position 74a of upper pivot 74, positively retracting lower pin 39 against the force of gravity to its positive stop 79. With both locking pins 38 and 39 fully retracted, pivot 76 is unable to move further inward, thus defining its inner position 76a, coinciding with stop 53. When the pins are projected, pivot 76 typically retraces its described pattern, following first arc 85 while lower pin 39 drops with the aid of gravity, and then following arc 84 as upper pin 38 is projected upward. The same comments apply to the other pair of pins 36 and 37. Thus, the described mechanism tends to retract the two upper pins only after the lower pins have been fully projected. That tendency to project the lower pins before the upper pins is due to gravity and also to the fact that the two coupling links 72 and 77 are quite sharply inclined downwardly toward the respective pin axes in gate-releasing position. Downward movement of the handle therefore transmits a pin-projecting thrust with greater mechanical advantage to the lower pins then to the upper pins. That characteristic facilitates locking of the gate since during the initial locking movement only the lower edge of the gate needs to be held in registered position.

It is desirable to provide, in addition to handle 58, control handles that are accessible to an operator standing near one edge of the gate or standing outside a door of the lading compartment adjacent the gate edge. That is readily accomplished with the present structure by providing access apertures through which the vertical links may be reached throughout their lateral movement. Such access apertures are shown illustratively at 91 in the edges of the stiles (FIG. 2) with supplementary openings at 90 in the gate faces. The accessible link sections may directly act as handles, or handle structures may be mounted on them. The remaining corner portions of the side post may be reinforced as indicated at 92.

When the panel portion of the gate includes crosswebs 94, clearance openings must be provided in those webs for the movement of coupling links 72 and 77 and for guide link 54. Such apertures are indicated at 96, and may be arranged so that relatively few different patterns of such apertures are required. If desired, guide link 54 may be replaced by other guide means, such as an upper guide bracket similar to bracket 52, for example.

A particular advantage of the described structure is that all the links are subjected only to direct tension or compression and are not required to support any significant bending stress. The locking system is particularly reliable when in locked position, since pivots 73 and 76 typically are then positioned outward of the pin axes 42 and 44, thus forming a toggle linkage that prevents either upper or lower pins from moving away from their locked positions even under conditions of extreme vibration. All of the movements of handle 58, as well as movements of the rest of the mechanism, are parallel to the plane of the gate, and neither the handle nor any other part of the mechanism is required to project outside the gate faces at any time.

A primary advantage of the present structure is the convenience with which all four locking pins can be controlled from a single handle, or from any selected one of several alternative handles. In particular, even though each pair of locking pins is secured by toggle action in their locking positions, both pairs of pins can be retracted by movement of either side handle as well as by movement of main handle 58. Inward movement of link 66, for example, directly releases the toggle actions of links 66 and 67. It also indirectly releases the toggle action of links 68 and 69 by acting through coupling links 72 and 77 to raise the main handle 58. The difficult problem of providing secure latching of all pins in their locking positions, while at the same time permitting unlatching of all pins from a variety of operating positions, is thereby solved in a remarkably simple manner.

It may be noted that mechanism of the present type can be used for controlling a single locking pin or a single pair of pins. For operating pin 36 alone, for example, lower pivot 71 may be fixed with relation to the gate. Inward movement of pivot 73 then follows an arc about fixed pivot 71, retracting upper pin 36. That is, the two links 66 and 67 with fixed pivot 71 provide a convenient manner of operating upper pin 36. Similarly, if upper pivot 70 is replaced by a fixed pivot, the links 66 and 67 provide a convenient manner of operating lower pin 37.

Accordingly, the mechanism of FIG. 1 may be viewed in its partial aspect as a mechanism for controlling upper pin 36. The movement of pivot 71 may then be overlooked; and the movement of pivot 70 may be similarly overlooked when viewing the mechanism in its partial aspect of controlling lower pin 37. In fact, the mechanism can be modified to provide separate pairs of links 66 and 67, one pair coupling upper pin 36 to a fixed lower pivot and the other coupling lower pin 37 to a fixed upper pivot. In such a mechanism, the intermediate pivots of the two link pairs, corresponding to pivot 73 of FIG. 1, follow slightly different paths. Their connections to coupling link 72 must embody sufficient flexibility to accommodate that difference, or two entirely separate coupling links 72 can be provided.

An illustrative control system of that type is represented schematically in FIG. 4. That system further illustrates a different type of control handle, which can be used equally well for operating the linkage arrangement of FIG. 1. As shown in FIG. 4, upper locking pin 36 on the left-hand side of the gate is coupled by the two links 66b and 67b to the pivot 95, fixedly mounted on the gate. In gate-locking position, the coupling link 72b holds the links 66b and 67b in slightly overcenter position, as shown in solid lines, positively holding pin 36 projected by toggle action. The handle lever 50b is pivotally mounted on the gate on the axis 96, and is provided with the handle 58b by which it may be swung from the gate-locking position shown in solid lines to the gate releasing position 50c. Those positions are defined by the positive stops 51b and 53b, and the lever is normally held in gate-locking position by the spring 80a. Coupling link 72b is pivotally mounted on lever 50b at 55b. Lever movement shifts coupling link 72b laterally of the pin axis to 72c, releasing the toggle lock and swinging the pin-actuating links to 66c and 67c, respectively. Pin 36 is thereby retracted, shifting its pivot 70b to the retracted position indicated schematically at 70c.

Lower pin 37 is similarly coupled by the links 67d and 66d to the fixed pivot 97. Those links are controlled by the coupling link 72d, which is pivotally connected to control lever 50b. As shown, links 72b and 72d have a common pivotal connection to the control lever, at 55b, but may be pivoted on different axes if desired to obtain the desired relative movement of the two pins. The gate releasing positions of the links controlling pin 37 are designated by subscripts e. The linkages controlling the two pins 38 and 39 on the right-hand side of the gate are typically substantially symmetrical to those just described, though small differences in link dimensions and pivot placement are ordinarily required to take account of the diametrically opposite point of connection 55d to control lever 50b. The operation of that linkage will be understood without detailed description.

As in the previously described embodiment, the present system can be operated either by central handle 58b, which may be constructed to be accessible from either face of the gate, or may be operated from either edge of the gate by utilizing as a handle any one of the generally vertical links, such as 67b, for example. When that link is swung inwardly to position 67c it drives control lever 50b to gate releasing position 50c, thereby operating the right-hand pair of locking pins as well as those at the left. That action is made possible by the fact that pivot 55b is angularly spaced from dead center position with respect to the length of link 72b, not only when in gate releasing position but throughout movement of lever 50b to gate releasing position. Control action applied at the right-hand edge of the gate has a corresponding effect.

The additional embodiment of the invention shown schematically in FIG. 5 employs fixed pivot points for each pin offset from the pin axis and adjacent the edge of the gate through which the pin is projected, in contrast to the fixed pivots of FIG. 4 which are adjacent the pin axis and remote from the pin. The action is generally similar to that already described for FIG. 4 and will be understood from the drawing without detailed description, the same numerals being used for corresponding parts when in corresponding positions. A significant distinction, however, between the link arrangement of FIG. 5 and those of FIG. 4 and 1 is that the links of FIG. 5 do not by themselves provide toggle locking of the pins in projected position. If such locking is not desired, a central control handle may be employed having link connections similar to those of FIG. 4, and the system can then be operated from the gate edges in the manner described for FIG. 4.

In the preferred form shown in FIG. 5, the pins are effectively locked in projected position by toggle action of the coupling links 72 with respect to control lever 50d. Such action is obtained by positioning pivot points 55b and 55d so that in the gate-locking position shown in solid lines those pivots are approximately at dead center position with respect to the length of the coupling links, that is, the longitudinal axis of the link passes substantially through the axis of lever pivot 96. That relation is only approximate in FIG. 5, since the angle between links 72b and 72d is exaggerated for clarity of illustration. In practice that angle would be smaller, with pivot 55b slightly over center with respect to the coupling links in gate-locking position. Lever 50d is positively stopped in that position, as by the stop pin fixedly mounted in the gate at 98, and is preferably yieldably urged toward that position, as by the spring 99.

That toggle action, by its very nature of locking the pin linkages, prevents release of the pins by operation of the vertical links at the edge of the gate. To permit operation from that position, the operating links 100 and 102 are pivotally mounted at one end on operating lever 50d at 103 and 105, respectively, and carry the handles 104 and 106 at their other ends. Those operating links are guided for sliding movement near their handle ends, as by the guide brackets 105 which are fixedly mounted on the gate. An operator can conveniently reach through an access aperture provided in the side edge of the gate, grasp the handle 104 or 106 and draw it toward him to the position indicated at 104a or 106a. That action directly rotates control lever 50d in a clockwise direction as seen in FIG. 5, releasing both toggle locks and shifting both pairs of pins to gate releasing position.

We claim:

1. In combination with a load-dividing gate that is movable between a plurality of working positions in a vehicle lading compartment, said gate having two pairs of locking pins mounted on the gate for movement with respect thereto, each pair comprising an upper and lower pin movable oppositely along a common vertical pin axis between projected positions in which they are engageable with respective locking formations mounted on the vehicle to lock the gate in a selected working position and retracted positions spaced from such formations to release the gate, the two pin axes being adjacent the respective side edges of the gate; control mechanism for the locking pins, comprising:

a control member mounted on the gate for relative translational movement along a generally vertical path adjacent the centerline of the gate between a lower gate-locking position and an upper gate-releasing position;

two elongated coupling members each pivotally connected at one end to the control member and extending therefrom toward the respective pin axes;

a pair of links pivotally interconnecting the respective pins of each pair to the other end of the corresponding coupling member, the links of each pair being approximately aligned with the pin axis and projecting the pins when the control member is in gate-locking position, and being oblique with respect to the pin axis and retracting the pins when the control member is in gate-releasing position;

the coupling members being inclined downwardly toward their said other ends at least in gate-releasing position of the control member, whereby movement of the control member downward toward gate-locking position tends to project the lower pins before the upper pins.

2. Control mechanism as defined in claim 1, and including:

a guide link for guiding said movement of the control member, the guide link being pivotally connected at one end to the control member adjacent said pivotal connections of the coupling members, and being pivotally connected at the other end to the gate at a point laterally spaced from the path of the control member;

the horizontal length of the guide link exceeding the vertical travel of the control member between its said positions by a sufficiently large factor that the movement path of said one end of the guide link is effectively rectilinear.